United States Patent [19]

Tokarz

[11] Patent Number: 4,883,940
[45] Date of Patent: Nov. 28, 1989

[54] HEATABLE COMPOSITE BACKLIGHT PANEL

[75] Inventor: Stephen P. Tokarz, Lincoln Park, Mich.

[73] Assignee: ASC Incorporated, Southgate, Mich.

[21] Appl. No.: 215,990

[22] Filed: Jul. 7, 1988

[51] Int. Cl.[4] .......................... B32B 27/40; B60L 1/02
[52] U.S. Cl. ...................................... 219/203; 428/216
[58] Field of Search ................. 219/203, 547; 428/216

[56] References Cited

U.S. PATENT DOCUMENTS

| | | | |
|---|---|---|---|
| 2,623,971 | 12/1952 | Glynn | 219/203 X |
| 3,514,581 | 5/1970 | Rocholl et al. | 219/203 X |
| 4,297,565 | 10/1981 | Parr | 219/203 X |
| 4,323,726 | 4/1982 | Criss et al. | 219/203 X |
| 4,540,622 | 9/1985 | Brunion et al. | 428/216 |
| 4,707,586 | 11/1987 | Voss et al. | 219/464 X |
| 4,710,612 | 12/1987 | Lin et al. | 219/547 |

*Primary Examiner*—Donald A. Griffin
*Attorney, Agent, or Firm*—Arnold S. Weintraub; Gerald R. Black

[57] ABSTRACT

The invention involves an inexpensive, rugged, flexible, composite plastic backlight panel that provides an even heat distribution across the entire surface of the backlight panel for a convertible top of a vehicle. Two wires are connected to the car battery. A series of conductive members are each in electrical engagement with each of the wires, forming a closed loop electric circuit. The conductive members are printed onto one of the laminates, forming an interlayer thereon. An inner transparent plastic laminate, and an outer transparent plastic laminate are sandwiched around one end of each of the wires, and the interlayer. The laminates including the wires and members are bonded together and the resulting panel is secured to the convertible top thereby forming the backlight panel. When the circuit is energized, the electrical energy is converted into thermal energy that is transmitted to the outer laminate.

19 Claims, 1 Drawing Sheet

HEATABLE COMPOSITE BACKLIGHT PANEL

BACKGROUND OF THE INVENTION

1. Field of the Invention

This invention relates generally to a heatable backlight panel, and more particularly, to a plastic composite backlight panel for convertible vehicles.

2. Background Art

The use of heatable window assemblies for removing ice and snow from the windows of aircraft and similar vehicles are well-known in the art.

U.S. Pat. No. 3,020,376 discloses a laminated plastic panel for aircraft that is electrically conductive so as to be kept free of ice and fog formations. In addition to the polyvinyl butyral sheet, the panel includes a sealer layer, an adhesive layer, an electrically conductive layer, a second adhesive layer, and a protective layer. The electrically conductive layer is deposited onto the panel by thermal evaporation methods.

U.S. Pat. No. 3,041,436 involves a transparent, electrically conductive window for aircraft for anti-fogging and de-icing applications. The window consists of an outer face sheet, an interlayer, and an inner ply. The inner side of the face sheet is coated with an electrically conductive coating.

U.S. Pat. No. 3,180,781 relates to a composite laminated structure consisting of two sheets of rigid plastic sandwiched around an interposed layer. The composite structure is primarily used for aircraft to prevent fogging and icing. An unbroken, electrically conductive film is applied to one of the laminated sheets, and may consist of a series of layers placed over each other. The interposed layer consists of a sealing layer, an adhesive layer, a conducting film layer, and a second adhesive layer.

U.S. Pat. No. 3,636,311 discloses a heating device for defrosting or deicing automobile windows. The layer of conductive material is printed or sprayed onto the surface of the polyester resin sheet. A self-adhesive border surrounds the sheet which is used to subsequently attache the sheet to a window or a windscreen.

Removing ice and snow from the flexible plastic backlight panels manually with scrapers and the like, is a problem because of the likelihood that the plastic will be scratched or otherwise damaged. Defrosting the backlight panel with blasts of hot air requires considerable time for the air to heat up in cold weather, and generally results in uneven heat distribution across the backlight panel.

Much of this prior art technology although applicable to automobiles, was developed primarily for the aircraft industry. Hence, the laminates are made of rigid plastic panels to withstand the extreme temperature and pressure differentials normally encountered at extreme flight altitudes.

Although rigid glass panels which may be heated through a plurality of electrical members mounted within the panels have been used in automobiles for many years, this technology has not bee refined for application to the thinner, flexible, plastic panels that are used in convertible tops. What is needed is an inexpensive, rugged, flexible, composite plastic backlight panel that provides an even heat distribution across the entire surface of the panel. The flexibility of the panel is critical because when the backlight panel is in the raised position, the panel will assume a curved configuration so as to enable the designer to provide sleek lines and an aerodynamically efficient design, but must lie flat in the retracted position for efficient storage.

SUMMARY OF THE INVENTION

The invention involves a novel, heatable backlight panel for a convertible top of a vehicle. Two wires are connected to the battery. A series of conductive members are each in electrical engagement with each of the wires, forming a closed loop electric circuit. An inner transparent plastic laminate, and an outer transparent plastic laminate are sandwiched around one end of each of the wires, and around each of the conductive members. The laminates including the wires and members are secured to the convertible top thereby forming the backlight panel. When the circuit is energized, the electrical energy is converted into thermal energy that is transmitted to the outer laminate.

A flexible plastic backlight for a convertible top has spaced laterally extending conductive members mounted on an interlayer between two laminate sheets. The electrically conductive interlayer is useful for removing snow or ice from the composite backlight panel. Additionally, the heatable backlight also removes some defects in creased or bent backlights.

For a more complete understanding of the composite backlight panel of the present invention, reference is made to the following presently preferred embodiment of the invention is illustrated by way of example. It is expressly understood, however, that the drawings are for purposes of illustration and description only, and are intended as a definition of the limits of the invention. Also, throughout the description and drawings, identical reference numbers refer to the same component throughout the several views.

DETAILED DESCRIPTION OF THE PREFERRED EMBODIMENT

Figure 1:
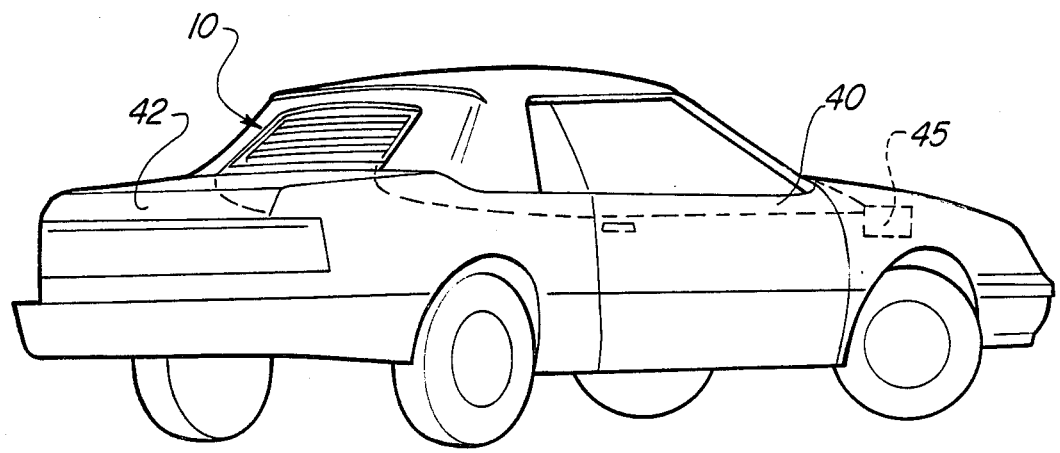
FIG. 1 is a perspective view of the heatable composite backlight panel in relation to a convertible automobile.
Figure 2:
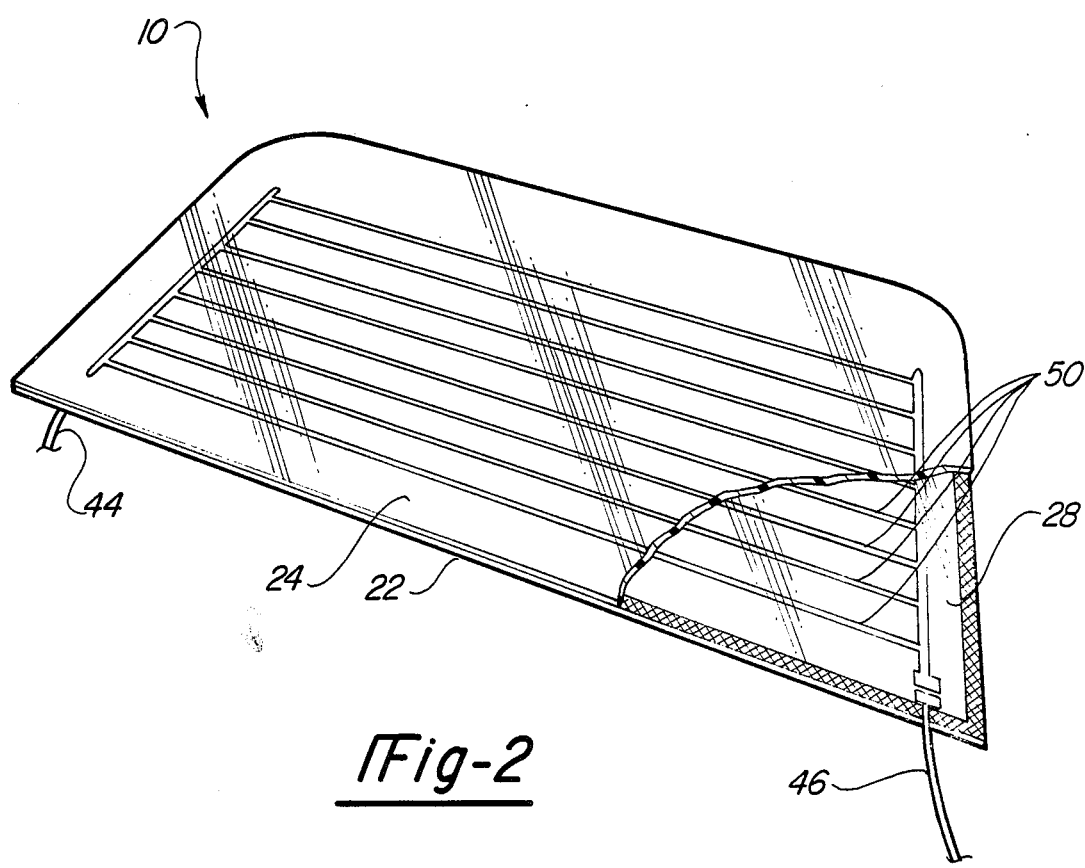
FIG. 2 is an assembly view of the heatable composite backlight panel, showing the laminates, the wires, and the conductive members.

A three layer capacitor-type construction forms the heatable backlight panel 10, using a power supply 45, which can be either ac or dc. The two outside layers consist of an inner and outer flexible plastic laminate 22 and 24 respectively, sandwiched about an interlayer 28 containing multiple electrical elements electrically interengaged. Two opposed wires 40 and 42 are each electrically engaged to a plurality of generally equally-spaced and parallel conductive members 50.

Conductive members 50 are used to heat the laminates 22 and 24. The laminates 22 and 24 are each made of Ultralite TM, which is a flexible polyvinyl chloride that is commercially available from Herbert Lushan Plastics Manufacturing Corp. of Newton, Mass.

One wire 40 is electrically engaged to the anode of power supply 45, and the other wire 42 is electrically engaged to the cathode. Preferably, the car battery acts as a power supply 45. The other end of each wire 44 and 46 is sandwiched between laminates 22 and 24 on the extreme, opposed sides thereof. The wire lengths are preferably about 550 mm. The combination of power supply 45, the two wires 40 and 42, and conductive members 50 form a closed loop electric circuit. When the circuit is energized the electrical energy flowing through conductive members 50 is converted into thermal energy that is transmitted into the outer laminate 24. The ac power requirements are in the range of from 100 to 180 volts, at 0.5 to 1.0 amps, and at a frequency of 60 to 500 hertz.

The dc power requirements are 5.0 to 8.0 amps at 13.0 volts. The available power is 96 watts (180.0 $V_{rms}$ X 0.53 amps). This power dissipation will yield a surface temperature of 90° F.–120° F. at an ambient temperature of 60° F. Based upon the size constraints of the backlight, the resistance of the conductive members may be changed by varying the amount of material, and the material composition.

The conductive members 50 extend essentially across the entire length of the interlayer 28. The members 50 may be wires or conductive tape, but are preferably conductive inks because of the flexibility requirements for panel 10. Although a silver conductive ink is preferred, a graphite conductive ink may also be used. The conductive inks are commercially available from MKS, Inc. of Indianapolis, Indiana. The conductive inks are applied by using a silk-screen process onto laminate 22.

The flexible heated backlight panel 10 is processed by first cutting a 0.020 inch thick laminate 22 from a polyvinyl chloride sheet. The heated grid pattern is screen printed onto one side of the laminate 22. The ink used is conductive and is resistance to the current flow, which is specified according to the vehicle application. The ink is composed of vehicle flakes suspended in a thermoplastic composition.

A thin strip of copper material (not shown) is applied to the interlayer 28 to provide a uniform heat flow across the backlight panel 10. A 0.030 inch thick copper strip which is 0.375 inches long is then bonded to he buss bars at either side of the grid pattern to assure even heating throughout the assembly. The strip is applied to the ink before the heat treatment. Conductive members 50 are crimped to ensure proper electrical connections, and to provide strain relief during the heat treatment. The printed side of the laminate 22 is then covered with another polyvinyl chloride laminate 24 having similar dimensions.

These two laminates 22 and 24 are then placed between two highly polished steel plates and pressed together at a temperature of at least 180° F. and a pressure of at least 200 psi. Initially, the laminates 22 and 24 are opaque. During compression, which takes about two minutes, the laminates 22 and 24 are fused together and become clear. The electrical leads are preferably connected to the backlight panel assembly 10 stapling the appropriate terminal to the laminated assembly through the copper buss bars disposed at both sides thereof.

The panel assembly 10 is then dielectrically bonded to the convertible top cover or the backlight carrier. This bonding material is a synthetic which is capable of remaining flexible after the dielectric bonding. The bonding material has butyl rubber inner ply, such as a diamond grain vinyl or a stayfast cloth. Prior to securing the backlight panel 10 to the fabric convertible roof, a black piece of the bonding material, which is about ⅜" thick is bond heat sealed around the panel 10. A dielectric bond is formed around the heat treated laminates 22 and 24.

While the invention has been described in conjunction with a specific embodiment, it is evident that many alternatives, modifications, and variations will be apparent to those skilled in the art in light of the disclosure herein. It is intended that all such alternatives, modifications, and variations are included herein that fall within the spirit and scope of the appended claims.

I claim:

1. A heatable backlight panel for a convertible top of a vehicle, which comprises:
    (a) a first laminate, the first laminate made of a first nonconductive material, having an anode and a cathode disposed on a first surface thereof;
    (b) an interlayer having a plurality of electrical members, the electrical members forming a plurality of electrical paths between the anode and the cathode, the interlayer being applied onto the first surface of the first laminate by a silk screening process, the anode and the cathode being electrically engageable with a power source; and
    (c) a second laminate disposed over the first surface of the first laminate, the second laminate being made from the first nonconductive material, the first laminate being fused to the second laminate to form a composite structure.

2. The panel of claim 1, wherein the first laminate is fused to the second laminate at an elevated temperature and pressure.

3. The panel of claim 1 wherein the laminates are made of a material which is opaque before the laminates are fused together.

4. The panel of claim 3, wherein the nonconductive material is made of polyvinyl chloride.

5. The panel of claim 1, wherein the heatable backlight panel is operable with both an ac and a dc power source.

6. The panel of claim 1, wherein the electrical members are silver conductive inks.

7. The panel of claim 6, wherein the silver conductive inks include flakes suspended in a thermoplastic composition.

8. The panel of claim 7, wherein the bonding material includes a ply of butyl rubber.

9. The panel of claim 1, wherein a material is bond heat sealed about the perimeter of the composite laminar structure.

10. The panel of claim 1, wherein the electrical members are generally equally-spaced and parallel to each other, providing a generally uniform heat flow across the composite laminar structure.

11. A method of forming a convertible top having a heatable backlight panel, the method comprising:
    (a) providing a first laminate of flexible plastic material, the first laminate being made from a first nonconductive material, an elongated anode and an elongated cathode being disposed on a first surface of the first laminate;
    (b) silk screening conductive inks to the first surface of the first laminate, the conductive inks providing a plurality of electrical connections between the anode to the cathode;
    (c) covering the first side of the first laminate with a second laminate, the second laminate being made of the first nonconductive material;
    (d) positioning the first laminate and the second laminate between two plates;
    (e) applying sufficient temperature and pressure for a sufficient period of time to fuse the first laminate to the second laminate to form a composite homogeneous structure; and (f) dielectrically bonding a material about the perimeter of the homogeneous structure.

12. The panel of claim 11, wherein the bonding material include a ply of butyl rubber.

13. The composite backlight panel of claim 11, wherein the two plates are highly polished steel.

14. The composite backlight panel of claim 11, wherein the fusing temperature is at least 180° F. and the fusing pressure is at least 200 psi, and the first laminate is fused to the second laminate in about two minutes.

15. A backlight panel having a first laminate fused to a second laminate, an elongated anode and an elongated cathode being disposed between the first laminate and the second laminate, electrical connections between the anode and the cathode being silk screened onto the first laminate, the composite backlight panel having a material bond heat sealed about the perimeter thereof, the composite backlight panel being formed by the process of claim 11.

16. A heatable backlight panel for a convertible top of a vehicle, which comprises:

(a) a nonconductive portion being formed by fusing a first laminate being made from a first nonconductive material to a second laminate, the second laminate being made from the first nonconductive material; and (b) a conductive interlayer having a plurality of electrical members disposed between an anode and a cathode, the electrical members forming a plurality of electrical paths between the anode and the cathode, the interlayer being applied onto the first surface of the first laminate by a silk screening process, the anode and the cathode being electrically engageable with a power source.

17. The panel of claim 20, wherein the nonconductive material is opaque before the laminates are fused together.

18. The panel of claim 21, wherein the nonconductive material is polyvinyl chloride.

19. The panel of claim 20, wherein a material is bond heat sealed about the perimeter of the composite laminar structure.

* * * * *